Aug. 9, 1960 W. H. HAY ET AL 2,948,826
INDUCTION LAMP
Filed April 9, 1956
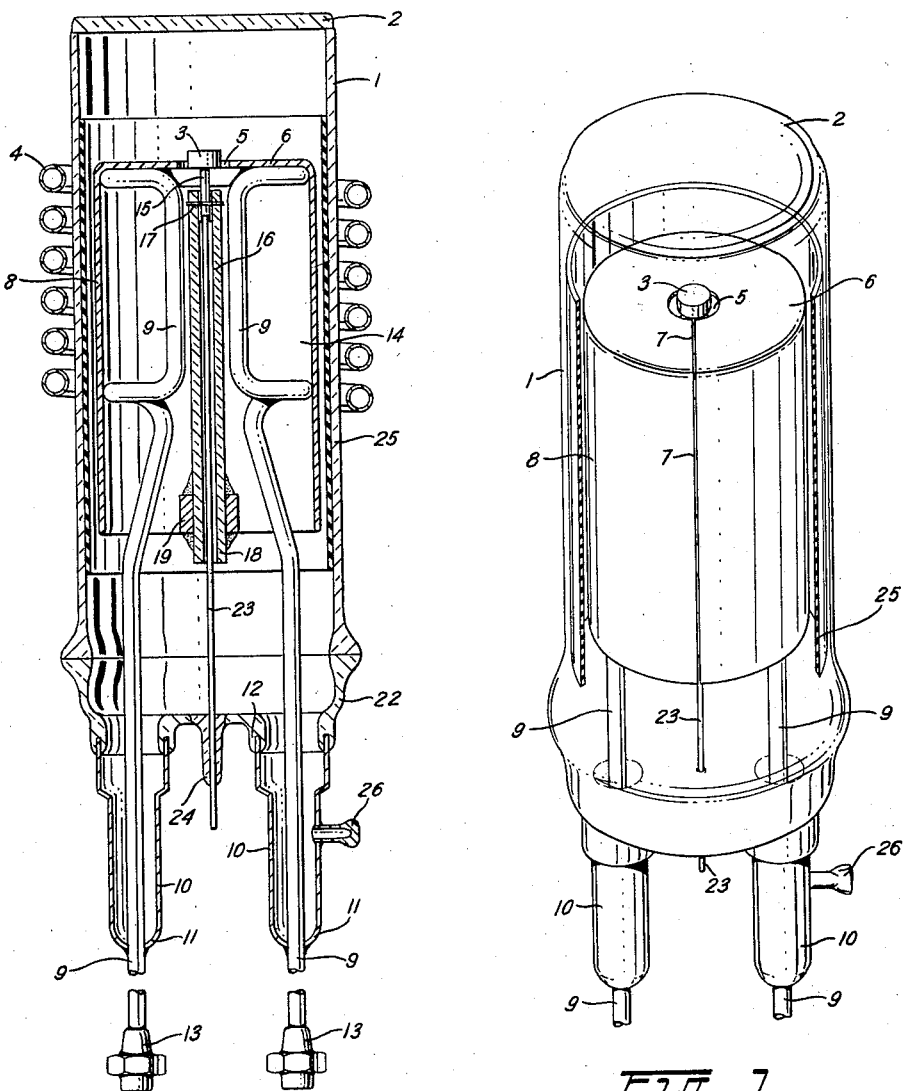
Fig. 1
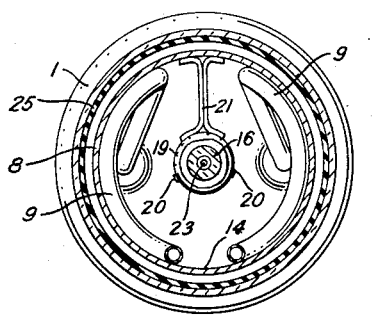
Fig. 2
Fig. 3
INVENTORS
WARREN H. HAY
FRITHJOF N. HANSEN
BY
Lawrence Burr,
ATTORNEY United States Patent Office 2,948,826
Patented Aug. 9, 1960

2,948,826

INDUCTION LAMP

Warren H. Hay, Beverly, and Frithjof N. Hansen, Beverly Farms, Mass., assignors, by mesne assignments, to Sylvania Electric Products Inc., Wilmington, Del., a corporation of Delaware Filed Apr. 9, 1956, Ser. No. 577,125

1 Claim. (Cl. 313—223)

This invention relates to induction lamps which use a refractory carbide target.

The targets of such lamps generally contain small amounts of carbon and other impurities which are difficult to remove completely, and yet which are extremely detrimental, causing blackening of the lamp and growth of crystals out from the target. Both of these effects tend to reduce the light output from the lamp in which the target is used.

We have discovered that the effect of the carbon can be removed and the light output improved during life by adding hydrogen to the inert gas previously used as a filling in said lamps. The hydrogen apparently reacts with the carbon given off from the incandescent surface and converts it to a hydrocarbon gas, thereby taking it out of the solid state.

We have found that too much hydrogen will conduct heat away from the target too rapidly, thus preventing the lamp from reaching its desired high temperature with good efficiency. On the other hand, too little hydrogen will not react sufficiently with the carbon, especially as the hydrogen will be gradually consumed during the operation of the lamp.

We have discovered that about 5% hydrogen is sufficient to control the carbon content of the target surface without reducing the operating temperatures of the lamp appreciably for a given electrical input. Hydrogen contents between about 2% to 8% hydrogen are satisfactory.

Other objects advantages and features of the invention will be apparent from the following description of one embodiment thereof, taken in conjunction with the accompanying drawings, in which:

In Figure 1, the glass envelope 1 includes the plane glass disc 2, of a type generally called an optical flat, through which light from the cylindrical target 3 can emerge when the latter is heated by the passage of a high frequency current in coil 4, which is external to the lamp and not an integral part thereof. The target 3 is set in the central opening 5 of an annular metal disc 6, and is of smaller diameter than said opening. The disc 6 has the radial slot 7 so that there will not be a complete conductive turn in which current can flow by induction. The disc 6 acts as a closure member for one end of the cylindrical metal shell 8, which extends longitudinally back in the envelope 1, preferably for a distance equal to the length of the coil 4 and in register therewith. The slot 7 extends from disc 6 longitudinally down the wall of cylinder 8, to prevent the cylinder's acting as a complete conductive turn, that is, as a so-called "shorted" turn. The disc 6 and shell 8 act to concentrate the magnetic field in the vicinity of the target.

The disc 6 and cylinder 8 can be made in one piece, if desired and are supported by the hollow metal tubes 9, 9 which are attached to the copper thimbles 10, 10 at the external ends 11, 11 thereof, said copper thimbles being sealed to the bottom wall 12 of the glass envelope 1 in a manner customary in the art of such seals, which are generally called "Housekeeper seals." Water or other cooling fluids can be passed through the tubes 9, 9 for cooling purposes, from outside the bulb.

The hollow tubes 9, 9 are not primarily electrical lead-in conductors, but are rather conductors for the circulation of a cooling liquid such as water. If the water supply is grounded, however, the tubes 9, 9 and the cylinder 8 and disc 6 to which they are thermally connected, will also be at ground potential.

The tubes 9, 9 should not extend across the slot 7 at any point, for if they did, they would short circuit it. In cases where liquid cooling is not desired, the concentrator disc 6 and shell 8 can be supported in some other manner than by tubes 9, 9 for example by being supported from the glass walls of envelope 1.

As shown in Figure 2, the hollow tubes 9, 9 terminate in the customary type of metal connectors 13, 13 used for sealing copper tubing together. Inside the envelope 1, the tubes 9, 9 extend around and across the inner wall 14 of cylinder 7, being attached thereto by soldering or in some other convenient manner.

The thickness of target 3 is greater than that of the disc 6, and the target is placed so that part of it extends above the plane of the top of said disc as shown in copending application Serial No. 520,767, filed July 8, 1955 by Frithjof N. Hansen, issued on December 18, 1956 as U.S. Patent No. 2,774,905. In one example, the target thickness was about 3/32 inch and the disc thickness about 1/8 inch. The disc 6 was about 2 inches in diameter. Beyond the 3/32 inch thickness of the target itself, the target piece was machined down to a diameter of about 1/16 inch to provide a projecting support 15 for the main portion of the target 3, said support extending about 3/8 inch back from said target itself. The diameter of the target 3 itself was 5/12 inch.

The bottom end of projecting support 15 projecting from target 3, is fitted into a hollow zirconia supporting tube 16 at a considerable distance, about 1/4 inch in one example, from the main target 3, in order to reduce heat losses. A metal pin 17 passes through the tube 16 and the projecting support 15 to secure them together. The zirconia tube extends downward along the axis of cylinder 8, and its lower end 18 is held in collar 19, by set screws 20. As shown in Fig. 3, the collar 19 is supported from the lower end of cylinder 8 in the bracket 21 held to said cylinder by welding, or in some other convenient manner. Other refractory materials than zirconia can be used, the zirconia being given as an example.

The whole internal unit or "mount" is thus supported from the Housekeeper seals 10, 10 set in the glass base of "header" 22. The seals 10, 10 can therefore be made before the glass header 22 is sealed to envelope 1, the sealing being accomplished in a manner well-known in the art.

In order to facilitate the application of a voltage for removal of crystals which tend to form on target 3 and short circuit the gap which separates it from the inside of annular disc 6, a lead-in wire 23 is sealed through the glass bead 24 in header 22, and connected to the lower end of the target's projecting support 15. The wire 23 can simply touch the support 15 for contact, and even a space between the end of the wire and the support 15 is generally permissible because of the high voltage used. The application of a voltage to remove crystal growth is shown in copending United States patent application Serial No. 556,550, filed December 30, 1955, by J. F. Waymouth and S. C. Peek, Jr., issued on January 1, 1959 as U.S. Patent No. 2,776,391.

The mica sheet 25 is wrapped around metal cylinder 8 to serve as insulation between the glass tube 1 and said cylinder. The glass tube sometimes breaks down by electrolysis and permits an arc between the coil 4 and the cylinder 8; the mica prevents such breakdown, because it does not electrolyze so readily and does not fuse.

After sealing the header 22 to envelope 1, the lamp can be exhausted through the exhaust tube 26 in a manner usual in the art, filled with gas at about 3 atmospheres absolute pressure, and the exhaust tube 26 itself then sealed off to complete the lamp. The gas is 95% argon and 5% hydrogen.

In operation, one of the tubes 9 is connected to a water inlet by connector 13, and the other tube 9 is connected to a water outlet by its connector 13. Water, or other cooling fluid, is then circulated through the tubes 9, thereby keeping the disc 6 and shell 8 cool. A high frequency source of say 4 megacycles although other frequencies can be used, is connected to coil 4, through which high frequency current will accordingly flow. The magnetic field inside said coil is concentrated, by disc 6 and shell 8, around the refractory target 3, which is accordingly heated by the currents induced in it. The target 3 becomes very hot, its temperature rising to about 3600° K. if sufficient energy is supplied.

The light from the front surface of target 3 then travels through the optical flat 2 to the plane in which it is to be used.

The embodiment described is merely by way of illustration, and the invention is not limited to that embodiment. Many modifications will be apparent to those skilled in the art, without departing from the scope and spirit of the invention. For example, the metal carbide targets can be heated by means other than induction if desired, and pressures differing widely from the 3-atmosphere value given can be used.

What we claim is:

An electric induction lamp comprising a sealed envelope, a refractory carbide induction target therein, and a filling therein consisting essentially of inert gas and about 2% to 8% hydrogen.

References Cited in the file of this patent
UNITED STATES PATENTS

| | | |
|---|---|---|
| 1,851,360 | Jacobsen | Mar. 29, 1932 |
| 2,171,359 | Gertler | Aug. 29, 1939 |
| 2,567,491 | Mitchell | Sept. 11, 1951 |
| 2,596,469 | Cooper | May 13, 1952 |
| 2,662,196 | Buckingham | Dec. 8, 1953 |
| 2,774,905 | Hansen | Dec. 18, 1956 |
| 2,776,391 | Peek | Jan. 1, 1957 |